(12) United States Patent
Dry

(10) Patent No.: US 10,377,674 B2
(45) Date of Patent: Aug. 13, 2019

(54) CONCRETE COATINGS AND COMPOSITIONS THAT ABSORB CARBON DIOXIDE

(71) Applicant: Carolyn Dry, Winona, MN (US)

(72) Inventor: Carolyn Dry, Winona, MN (US)

( * ) Notice: Subject to any disclaimer, the term of this patent is extended or adjusted under 35 U.S.C. 154(b) by 106 days.

(21) Appl. No.: 15/012,808

(22) Filed: Feb. 1, 2016

(65) Prior Publication Data

US 2016/0229760 A1 Aug. 11, 2016

Related U.S. Application Data

(60) Provisional application No. 62/125,813, filed on Feb. 2, 2015, provisional application No. 62/289,123, filed on Jan. 29, 2016.

(51) Int. Cl.

| | |
|---|---|
| *C04B 41/68* | (2006.01) |
| *C09D 1/02* | (2006.01) |
| *C04B 41/00* | (2006.01) |
| *C09D 1/00* | (2006.01) |
| *C09D 1/10* | (2006.01) |
| *C04B 41/50* | (2006.01) |
| *C04B 41/65* | (2006.01) |
| *C04B 28/26* | (2006.01) |
| *C04B 111/60* | (2006.01) |
| *C04B 111/40* | (2006.01) |
| *C04B 111/00* | (2006.01) |

(52) U.S. Cl.
CPC ............ *C04B 41/009* (2013.01); *C04B 28/26* (2013.01); *C04B 41/501* (2013.01); *C04B 41/65* (2013.01); *C09D 1/00* (2013.01); *C09D 1/02* (2013.01); *C09D 1/10* (2013.01); *C04B 2111/00017* (2013.01); *C04B 2111/0075* (2013.01); *C04B 2111/40* (2013.01); *C04B 2111/60* (2013.01)

(58) Field of Classification Search
CPC ....... C04B 28/26; C04B 14/06; C04B 14/305; C04B 2103/40; C04B 38/0054; C04B 7/02; C04B 41/009; C04B 41/501; C04B 2103/001; C04B 22/064; C04B 22/068; C04B 28/02; C04B 41/4535; C04B 41/4556; C04B 2111/00017; C04B 2111/0075; C04B 2111/40; C04B 2111/60; C04B 41/65; C09D 1/00; C09D 1/02; C09D 1/10
See application file for complete search history.

(56) References Cited

U.S. PATENT DOCUMENTS

| | | | | |
|---|---|---|---|---|
| 2,377,048 A | * | 5/1945 | Smith | ................ B23K 35/3602 |
| | | | | 148/26 |
| 5,106,423 A | * | 4/1992 | Clarke | .................... C04B 7/527 |
| | | | | 106/714 |
| 2013/0025498 A1 | | 1/2013 | Richard et al. | |

FOREIGN PATENT DOCUMENTS

| | | | |
|---|---|---|---|
| CN | 101407358 | * | 1/2013 |
| WO | WO2010026155 | * | 3/2010 |

OTHER PUBLICATIONS

Examiner's Report received in Canadian Pat. Appl. No. 2919918 dated Dec. 13, 2016 (6 pages).

* cited by examiner

*Primary Examiner* — Shuangyi Abu Ali
(74) *Attorney, Agent, or Firm* — Foley & Lardner LLP

(57) ABSTRACT

Disclosed are compositions containing at least 5 wt. % of a silicate based on the total weight of the composition, wherein the silicate is an alkali metal silicate and/or an alkaline earth metal silicate, at least 20 wt. % of one or more calcium oxygenates; and water to 100 wt. %.

19 Claims, 11 Drawing Sheets

CONCRETE COATINGS AND COMPOSITIONS THAT ABSORB CARBON DIOXIDE

RELATED APPLICATIONS

This application claims priority to U.S. Provisional Application Ser. No. 62/125,813, filed Feb. 2, 2015, and to U.S. Provisional Application Ser. No. 62/289,123, filed Jan. 29, 2016, which are hereby incorporated by reference in their entireties.

BACKGROUND

The present technology is generally related to concrete coatings or penetrants and methods to prepare and use the same.

SUMMARY

In one aspect, provided herein are compositions comprising at least 5 wt. % of a silicate based on the total weight of the composition, wherein the silicate is an alkali metal silicate and/or an alkaline earth metal silicate; at least 20 wt. % of one or more calcium oxygenates; and water to 100 wt. %. In some embodiments, the silicate is selected from lithium silicate, lithium polysilicate, sodium silicate, potassium silicate, magnesium silicate, or a combination of any two or more thereof. In some embodiments, the silicate is lithium polysilicate. In some embodiments, the composition comprises 15-30 wt. % of a silicate. In some embodiments, the calcium oxygenates are selected from the group consisting of calcium oxide, calcium hydroxide, lime and calcium peroxide. In some embodiments, the composition comprises 25-75 wt. % of the calcium oxygenates. In some embodiments, the composition comprises 40-60 wt. % of the calcium oxygenates. In some embodiments, the composition further comprises a surfactant. In some embodiments, the surfactant is selected from a non-ionic surfactant, cationic surfactant, or a mixture of both. In some embodiments, the composition further comprises titanium oxide. In some embodiments, the composition further comprises sand. In some embodiments, the composition absorbs carbon dioxide and gives off oxygen.

In another aspect, provided herein are compositions comprising 15-30 wt. % of an alkali metal silicate; 40-60 wt. % of one or more calcium oxygenates selected from the group consisting of lime and calcium peroxide; and water to 100 wt. %. In some embodiments, the alkali metal silicate is lithium polysilicate, lithium silicate, sodium silicate, or any combination thereof.

In another aspect, provided herein are concrete compositions comprising cement, aggregate, sand and a composition disclosed herein. In some embodiments, the concrete composition hardens into a porous concrete with a pore size greater than about 10 μm.

In another aspect, provided herein are concrete structures coated at least in part with a composition disclosed herein.

In another aspect, provided herein are methods of preparing a composition disclosed herein comprising combining silicate, one or more calcium oxygenates, and water.

In another aspect, provided herein are methods comprising coating at least in part a concrete surface with a composition disclosed herein. In some embodiments, the surface is a concrete floor, a concrete road, or a concrete bridge. In some embodiments, the concrete surface comprises Portland cement, geopolymer cement, or fly ash.

In another aspect, provided herein are methods comprising coating at least part of a surface of concrete and/or penetrating the concrete with a mixture of calcium peroxide and water, wherein the mixture subsequently strengthens the concrete, absorbs carbon dioxide, or releases oxygen, or any combination thereof.

DETAILED DESCRIPTION

Figure 1A:
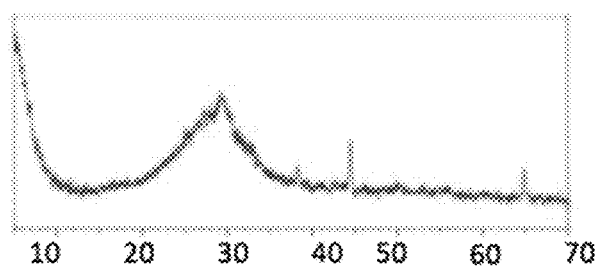
FIG. 1A depicts a representative x-ray diffraction image confirming formation of C—S—H from the reaction between silicate, water, and calcium hydroxide.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In the United States, coal-fired power plants supply roughly 50% of our electrical energy needs and produce over 2.4 billion tons of $CO_2$ each year and thus there is a tremendous opportunity to utilize this excess $CO_2$ as a product feedstock. Adding to the total $CO_2$ emissions problem, the production of Portland cement, a key ingredient in concrete, accounts for about 8% of $CO_2$ emissions worldwide. Therefore, a value-added product which would both provide a permanent $CO_2$ sequestration site while significantly reducing the quantity of concrete required would have a significant economic and environmental impact.

Accordingly, provided herein, in one aspect, is a concrete coating or penetrant, which absorbs $CO_2$ while simultaneously increasing concrete strength. In some embodiments, the concrete coating or penetrant is a composition comprising one or more calcium oxygenates and water. In some embodiments, the concrete coating or penetrant is a composition comprising a silicate, one or more calcium oxygenates, and water. In some embodiments, the composition absorbs at least 20% of the treated concrete's mass of $CO_2$ released in processing while simultaneously increasing the concrete strength by a minimum factor of 2.5- to 4-fold. In some embodiments, the composition absorbs $CO_2$ and gives off $O_2$.

In some embodiments, while not being bound by a specific theory, it is believed that the silicate in the composition reacts with calcium in the concrete to produce calcium silicate hydrates (C—S—H). This resultant C—S—H reacts with the $CO_2$ in the atmosphere in the presence of moisture to yield a dimensionally stable silica gel network with strong calcium carbonate ($CaCO_3$) in some of its interstitial pores. This stronger, denser "crust" reduces porosity, strengthens, and densities the concrete.

The silicate may be an alkali metal silicate and/or an alkaline earth metal silicate. The alkali metal or alkaline earth metal may be lithium, sodium, potassium, or magnesium. Illustrative alkali metal silicates and alkaline earth metal silicates include, but are not limited to, lithium silicate, lithium polysilicate, sodium silicate, potassium silicate, magnesium silicate, and a combination of any two or more thereof. In some embodiments, the silicate is lithium silicate. In some embodiments, the silicate is lithium polysilicate (LPS). In some embodiments, the silicate is sodium silicate. In some embodiments, the silicate is potassium silicate. In some embodiments, the silicate is magnesium silicate. In some embodiments, the silicate is lithium silicate and/or sodium silicate. In some embodiments, silicate is represented by the formula, $X_nSiO_3$, wherein X is any appropriate counter ion and n=1 or 2. In further embodiments, X is lithium and n is 2. In some embodiments, silicate is represented by the formula, $X_nSi_5O_{11}$, wherein X is any appropriate counter ion and n=1 or 2. In further embodiments, the formula is $X_2Si_5O_{11}$. In still further embodiments, X is lithium.

The composition may comprise at least 5 wt. % of a silicate based on the total weight of the composition. This includes about 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt. %, or more, including increments therein, of a silicate based on the total weight of the composition. In some embodiments, the composition comprises at least 10 wt. % of a silicate based on the total weight of the composition. In some embodiments, the composition comprises 10-40 wt. % of a silicate based on the total weight of the composition. In some embodiments, the composition comprises 10-35 wt. % of a silicate based on the total weight of the composition. In some embodiments, the composition comprises 10-30 wt. % of a silicate based on the total weight of the composition. In some embodiments, the composition comprises 10-25 wt. % of a silicate based on the total weight of the composition. In some embodiments, the composition comprises 10-20 wt. % of a silicate based on the total weight of the composition. In some embodiments, the composition comprises 15-40 wt. % of a silicate based on the total weight of the composition. In some embodiments, the composition comprises 15-35 wt. % of a silicate based on the total weight of the composition. In some embodiments, the composition comprises 15-30 wt. % of a silicate based on the total weight of the composition. In some embodiments, the composition comprises 15-25 wt. % of a silicate based on the total weight of the composition.

As used herein, and unless otherwise defined, the term "oxygenate" means oxide, peroxide, hydroxide, or any combination thereof.

Illustrative calcium oxygenates include, but are not limited to, calcium oxide, calcium hydroxide, lime, calcium peroxide, and any combination thereof. In some embodiments, one or more calcium oxygenates are selected from the group consisting of calcium oxide, calcium hydroxide, lime and calcium peroxide. In some embodiments, the one or more calcium oxygenates is calcium peroxide. In some embodiments, the one or more calcium oxygenates is lime.

The composition may comprise at least 10 wt. % of one or more calcium oxygenates. This includes at least 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt. %, or more, including increments therein, of one or more calcium oxygenates. The composition may comprise about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt. %, or more, including increments therein, of one or more calcium oxygenates. In some embodiments, the composition comprises 15-80 wt. % of one or more calcium oxygenates. In some embodiments, the composition comprises 15-75 wt. % of one or more calcium oxygenates. In some embodiments, the composition comprises 15-60 wt. % of one or more calcium oxygenates. In some embodiments, the composition comprises 15-50 wt. % of one or more calcium oxygenates. In some embodiments, the composition comprises 20-80 wt. % of one or more calcium oxygenates. In some embodiments, the composition comprises 20-75 wt. % of one or more calcium oxygenates. In some embodiments, the composition comprises 20-60 wt. % of one or more calcium oxygenates. In some embodiments, the composition comprises 20-50 wt. % of one or more calcium oxygenates. In some embodiments, the composition comprises 25-80 wt. % of one or more calcium oxygenates. In some embodiments, the composition comprises 25-75 wt. % of one or more calcium oxygenates. In some embodiments, the composition comprises 25-60 wt. % of one or more calcium oxygenates. In some embodiments, the composition comprises 25-50 wt. % of one or more calcium oxygenates. In some embodiments, the composition comprises 40-80 wt. % of one or more calcium oxygenates. In some embodiments, the composition comprises 40-75 wt. % of one or more calcium oxygenates. In some embodiments, the composition comprises 40-60 wt. % of one or more calcium oxygenates.

In some embodiments, the composition excludes lithium peroxide. The composition may comprise at least 20 wt. % of water. This includes about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt. %, or more, including increments therein, of water.

In another aspect, provided herein are compositions comprising at least 5 wt. % of a silicate based on the total weight of the composition, wherein the silicate is an alkali metal silicate and/or an alkaline earth metal silicate; at least 20 wt. % of one or more calcium oxygenates; and water to 100 wt. %. In some embodiments, the composition consists essentially of at least 5 wt. % of a silicate based on the total weight of the composition, wherein the silicate is an alkali metal silicate and/or an alkaline earth metal silicate; at least 20 wt. % of one or more calcium oxygenates; and water to 100 wt. %.

In another aspect, provided herein are compositions comprising at least 10 wt. % of a silicate based on the total weight of the composition, wherein the silicate is an alkali metal silicate and/or an alkaline earth metal silicate; at least 20 wt. % of one or more calcium oxygenates; and water to 100 wt. %. In some embodiments, the composition consists essentially of at least 10 wt. % of a silicate based on the total weight of the composition, wherein the silicate is an alkali metal silicate and/or an alkaline earth metal silicate; at least 20 wt. % of one or more calcium oxygenates; and water to 100 wt. %.

In another aspect, provided herein are compositions comprising at least 15-30 wt. % of an alkali metal silicate; 40-60 wt. % of one or more calcium oxygenates selected from the group consisting of lime and calcium peroxide; and water to 100 wt. %. In some embodiments, the silicate is lithium silicate and/or sodium silicate. In some embodiments, the composition consists essentially of at least 15-30 wt. % of an alkali metal silicate; 40-60 wt. % of one or more calcium oxygenates selected from the group consisting of lime and calcium peroxide; and water to 100 wt. %.

The composition may further comprise a surfactant. The surfactant may be a non-ionic surfactant, cationic surfactant, or a mixture of both. Illustrative non-ionic surfactants include, but are not limited to, polyoxyethylene glycol alkyl ethers, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, cocamide MEA, cocamide DEA, dodecyldimethylamine oxide, poloxamers, and fatty alcohols. Illustrative cationic surfactants include, but are not limited to, fatty amines, fatty amine salts, and quaternary derivatives of fatty amines. Non-limiting examples of cationic surfactants include alkyltrimethylammonium salts (e.g., cetyl trimethylammonium bromide), cetylpyridinium chloride, benzalkonium chloride, benzethonium chloride, 5-bromo-5-nitro-1,3-dioxane, dimethyldioctadecylammonium chloride, cetrimonium bromide, and dioctadecyldimethylammonium bromide.

The composition may further comprise titanium oxide. Titanium oxide may be present in the composition in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt. %, or more, including increments therein.

The composition may further comprise sand. Sand may be present in the composition in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt. %, or more, including increments therein.

In some embodiments, the composition, after application onto or into a concrete structure, absorbs at least 1% of the treated concrete's mass of $CO_2$ released in processing. This includes about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90%, or more, including increments therein, of the treated concrete's mass of $CO_2$ released in processing. In some embodiments, the composition, after application onto or into a concrete structure, absorbs at least 5% of the treated concrete's mass of $CO_2$ released in processing. In some embodiments, the composition, after application onto or into a concrete structure, absorbs at least 10% of the treated concrete's mass of $CO_2$ released in processing.

In some embodiments, the composition, after application onto or into a concrete structure, increases concrete strength. In some embodiments, the concrete strength is increased at least by a factor of 1.1-fold. This includes a factor of about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0, or more, including increments therein.

In another aspect, provided herein are concrete compositions comprising a concrete coating or penetrant disclosed herein. In some embodiments, the concrete composition comprises cement, aggregate, sand and a composition disclosed herein. In some embodiments, the concrete composition results in a porous concrete with larger than usual pores. In some embodiments, the larger than usual pores are over 10 μm in diameter. This includes pores with diameters of about 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 μm, or more. In some embodiments, the larger than usual pores are larger than the pores of concrete devoid of a composition disclosed herein. In some embodiments, the concrete composition results in a porous concrete with a pore size greater than about 10 µm. This includes a pore size greater than or at about 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 µm, or more.

In another aspect, provided herein are concrete structures coated at least in part with a composition disclosed herein. The concrete structures may comprise one or more types of concrete. Illustrative types of concrete include, but are not limited to, concrete comprising Portland cement, concrete comprising geopolymer cement, and concrete comprising fly ash.

In another aspect, provided herein are concrete structures penetrated at least in part with a composition disclosed herein. The concrete structures may comprise one or more types of concrete. Illustrative types of concrete include, but are not limited to, concrete comprising Portland cement, concrete comprising geopolymer cement, and concrete comprising fly ash.

In another aspect, provided herein are concrete structures coated and/or penetrated, at least in part, with one or more compositions disclosed herein. The concrete structures may comprise one or more types of concrete. Illustrative types of concrete include, but are not limited to, concrete comprising Portland cement, concrete comprising geopolymer cement, and concrete comprising fly ash.

In another aspect, provided herein are methods of preparing the compositions disclosed herein. In some embodiments, the method comprises combining silicate, one or more calcium oxygenates, and water. In some embodiments, the method comprises combining silicate, one or more calcium oxygenates, and water inside the concrete.

In another aspect, provided herein are methods of preparing a treated concrete structure. As used herein, the term "treated concrete structure" means a concrete structure comprising a complete or partial coating with a composition disclosed herein, penetration of the concrete structure with a composition disclosed herein, or a combination thereof. In some embodiments, the method comprises coating at least in part a concrete surface of a concrete structure with a composition disclosed herein. In some embodiments, the method comprises penetrating a concrete structure with a composition disclosed herein. In some embodiments, the method comprises coating at least in part a concrete surface of a concrete structure with a composition disclosed herein and penetrating the concrete structure with a composition disclosed herein.

In another aspect, provided herein are methods comprising coating at least in part a concrete surface with a composition disclosed herein. In some embodiments, the concrete surface is a concrete floor, a concrete road, or a concrete bridge. In some embodiments, the coating subsequently (a) strengthens the concrete, (b) absorbs carbon dioxide, or (c) releases oxygen, or (d) any combination thereof.

In another aspect, provided herein are methods comprising coating at least part of a surface of concrete with a mixture of calcium peroxide and water. In some embodiments, the coating subsequently (a) strengthens the concrete, (b) absorbs carbon dioxide, or (c) releases oxygen, or (d) any combination thereof.

In another aspect, provided herein are methods comprising coating at least part of a surface of concrete and/or penetrating the concrete with a mixture of calcium peroxide and water. In some embodiments, the coating subsequently (a) strengthens the concrete, (b) absorbs carbon dioxide, or (c) releases oxygen, or (d) any combination thereof.

In another aspect, provided herein are methods comprising penetrating the concrete with a mixture of calcium peroxide and water. In some embodiments, the coating subsequently (a) strengthens the concrete, (b) absorbs carbon dioxide, or (c) releases oxygen, or (d) any combination thereof.

In another aspect, provided herein are methods comprising coating at least part of a surface of concrete and/or penetrating the concrete with a mixture of lithium silicate and lime. In some embodiments, the coating subsequently (a) strengthens the concrete, (b) absorbs carbon dioxide, or (c) releases oxygen, or (d) any combination thereof.

In another aspect, provided herein are methods of strengthening a concrete structure by coating at least in part the concrete structure and/or penetrating the concrete structure with a composition disclosed herein.

The present invention, thus generally described, will be understood more readily by reference to the following examples, which are provided by way of illustration and are not intended to be limiting of the present invention.

EXAMPLES

Example 1

X-Ray Diffraction Studies of Calcium Silicate Hydrate (C—S—H)

The following chemical reaction was studied:

$$yX_2SiO_3 + xCa(OH)_2 \rightarrow xCaO.ySiO_3.H_2O + 2xX(OH)$$

The binding of calcium to silicate in order to produce C—S—H was confirmed using x-ray diffraction (FIG. 1A). No evidence of calcium in the form of calcium hydroxide starting material or as calcium carbonate is visible, suggesting incorporation into C—S—H.

Figure 1B:
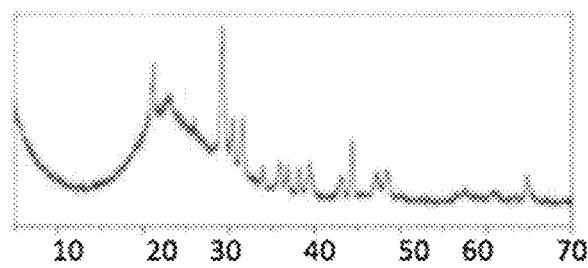
FIG. 1B depicts a representative x-ray diffraction image confirming formation of calcium carbonate when a sample of C—S—H from FIG. 1A is exposed to $CO_2$.
Figure 2A:
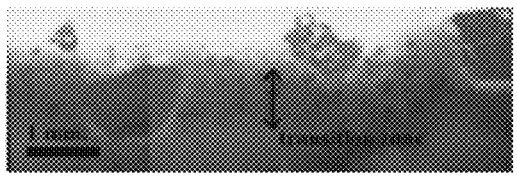
FIGS. 2A-2D depict representative petrographic data for (a) a surface coated with $X_2Si_5O_{11}$ (polysilicate), (b) a surface patched with C—S—H and sand mixture, (c) a surface coated with $X_2Si_5O_{11}$ and then patched with C—S—H and sand mixture, and (d) a surface with no coating.
Figure 2B:
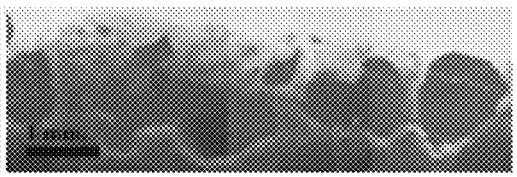
Figure 2C:
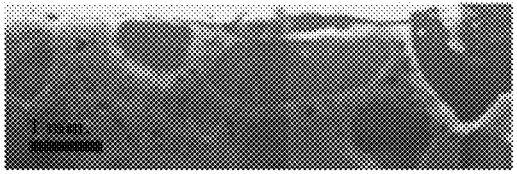
Figure 2D:
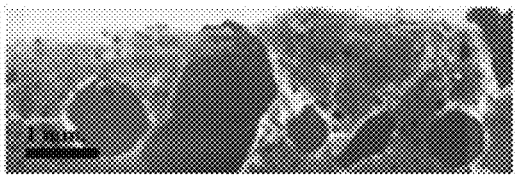

Samples of this C—S—H were exposed to $CO_2$ to produce calcium carbonate and silica gel. The specimens were placed in an enriched 100% $CO_2$ atmosphere at 23° C., 50% RH. After 24 hours of such exposure (such conditions being equivalent to 2 years of real atmospheric $CO_2$), the specimens were examined by XRD (see FIG. 1B). The XRD pattern indicates the formation of $CaCO_3$ (i.e., carbonation has taken place) when C—S—H was exposed to the $CO_2$.

Example 2

Correlation of Accelerated Carbonation Time with Actual Carbonation Time

In order to correlate the accelerated carbonation time to actual carbonation timescale, during which atmospheric $CO_2$ is taken up, concrete specimens coated with a composition containing 20 wt. % polysilicate in water were placed in tents with different percentages (5% and 100%) of $CO_2$. Since the $CO_2$ uptake exhibited a linear relationship with time at the initial stages of absorption, a direct relationship was derived for the $CO_2$ absorption of these samples. It was seen that 24 hours of 100% $CO_2$ exposure was equal to 12 days of 5% $CO_2$ exposure. It was previously observed that 1 week of exposure of 4% $CO_2$ was equivalent to 1 year of exposure to normal atmosphere.

The results of these experiments yielded a variety of evidence that $CO_2$ was absorbed. The evidence was in the difference in the performance between the control samples placed in the nitrogen-filled tent and those placed in the $CO_2$-filled tent. The samples exposed to nitrogen dissolved in water whereas the $CO_2$-cured ones, even after only 10 minutes in the tent with $CO_2$, remained intact in water. The $CO_2$-exposed samples became very hot (about 110° F.) just after they were exposed to $CO_2$, but the control specimens did not get hot. This heat reaction indicated a chemical reaction was taking place. Furthermore, the $CO_2$-exposed samples had a harder surface. The samples exposed to 100% $CO_2$ for 24 hours gained an average of 10% additional dry weight while the control samples exposed to nitrogen gained virtually no weight (less than 0.8%). The compression tests showed that the samples exposed to $CO_2$ had an average of 136% higher strength capacity (i.e., they were approximately 2.4 times stronger), than the control specimens. Additionally, in porosity tests, there was an average of 6% decrease in the porosity of the samples that were exposed to 100% carbon dioxide for 24 hours. Carbonation depth studies using phenolphthalein dye indicated that the $CO_2$ had penetrated to ⅝ inch in the samples exposed to 100% $CO_2$ for 24 hours. The nitrogen exposed samples showed no carbonation.

In summary, the coating material that formed after C—S—H reacted with atmospheric $CO_2$ for the equivalent of two years was 2.4 times stronger, denser and less porous than the control specimen. These experimental findings lend support for the hypothesis that the formation of C—S—H creates volume and reduces porosity, and the silica, left behind when the C—S—H reacts with the $CO_2$, further fills in the microstructure as a lattice like gel.

Example 3

In-Field Testing

Outdoor concrete samples were painted with a clear coating solution containing 20 wt. % polysilicate in water. After 3 months, noticeable color differences were observed: the polysilicate-covered sections had become lighter in color than the surrounding non-covered surface, suggesting a reaction had occurred. Depth of carbonation was ascertained to be ⅝ inch. Density was increased by 10% and porosity reduced by 6%.

Specimens of the outdoor concrete samples were examined for depth of carbonation using ASTM C856 guidelines. Petrographic data are shown in FIGS. 2A-D for samples having (a) a surface coated with $X_2Si_5O_{11}$ (polysilicate), (b) a surface patched with C—S—H and sand mixture, (c) a surface coated with $X_2Si_5O_{11}$ and then patched with C—S—H and sand mixture, or (d) a surface with no coating. As the images reveal, the surface coated with $X_2Si_5O_{11}$ had the deepest carbonation penetration.

Example 4

Carbon Dioxide Testing of Coated Concrete

The objective of this study was to test the effects of two different coatings designed specifically for concrete. These coatings were designed to uptake $CO_2$ outgassed by the concrete and in return produce $O_2$, thereby providing an environmentally friendly benefit.

Concrete samples were prepared according to the following procedure. Water (100 mL) was added to Portland cement (300 g), and the resultant mixture was stirred well. The mixture was poured into 2 in.×2 in.×2 in. metal boxes and allowed to sit for 2 days. After the two-day period, the samples from each box were removed and allowed to sit in ambient air for another two days prior to further use.

Gas chamber used in these sealed chamber experiments had a volume of 9.5 cubic feet or 269 liters.

The mass of the coating per sample was 200 g. Each side of a 2 in.×2 in.×2 in. sample was coated, though the sample rested on one side.

The two coatings have a common chemical, lithium polysilicate (LPS). When LPS is mixed with a variety of chemicals it is known to uptake $CO_2$ while releasing $O_2$. The first coating was a 1:1 mixture by weight of LPS and lime (CaO/Ca(OH)$_2$). When LPS and lime are mixed together, they react to make C—S—H which then can react with atmospheric $CO_2$ to produce calcium carbonate ($CaCO_3$) a hard, rock-like structure, water ($H_2O$) and oxygen ($O_2$). The coating was spread over the top of the concrete block. Initially the coating was a thick slurry but it quickly hardened.

The second coating was a 1:1 mixture by weight of LPS and calcium peroxide ($CaO_2$). Calcium peroxide does not react with LPS by itself, but when it comes into contact with atmospheric water, it degrades into lime which reacts with LPS in the same manner as explained above. The initial coating was a thick, viscous mixture that hardened into a similar coating as the first coating (LPS and lime).

A large rectangular gas chamber was used. A hygrometer was placed inside to measure relative humidity (RH), and the temperature of the room was adjusted to approximately 25° C. The RH was between 45-50%, initially for all trials. The gas analyzer was turned on, warmed up, and hooked up to the gas chamber. Once those two parameters were adjusted, a 1:1 mixture by weight of the two chemicals being used were measured out and mixed together. Two concrete samples were quickly coated inside a plastic bucket and placed inside the gas chamber. The chamber was sealed, purged, and filled to capacity with carbon dioxide from a compressed gas tank to a 40-60 vol % of $CO_2$. Readings of gas content and amount were taken every few hours from the gas analyzer for 3 days. To calculate the effect, each day under 100% $CO_2$, at 50% RH, and 25° C. is equivalent to two years under standard atmospheric conditions. Therefore this testing over the three-day period was equivalent to six years under standard conditions. The LPS was obtained from Sigma Aldrich, lime was purchased from Menards, and the calcium peroxide was a sample obtained from AIC. The results for each trial are presented in FIGS. 3 and 4.

Figure 3:
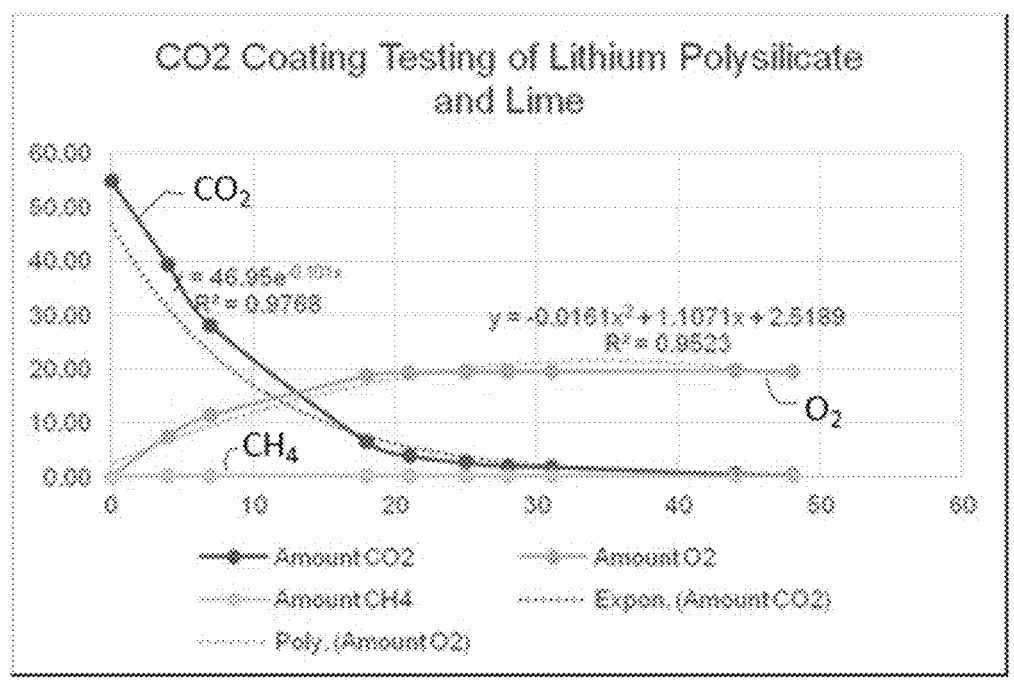
FIG. 3 depicts gas analysis results from a $CO_2$-exposure test of a non-limiting example of concrete coated with lithium polysilicate and lime.
Figure 4:
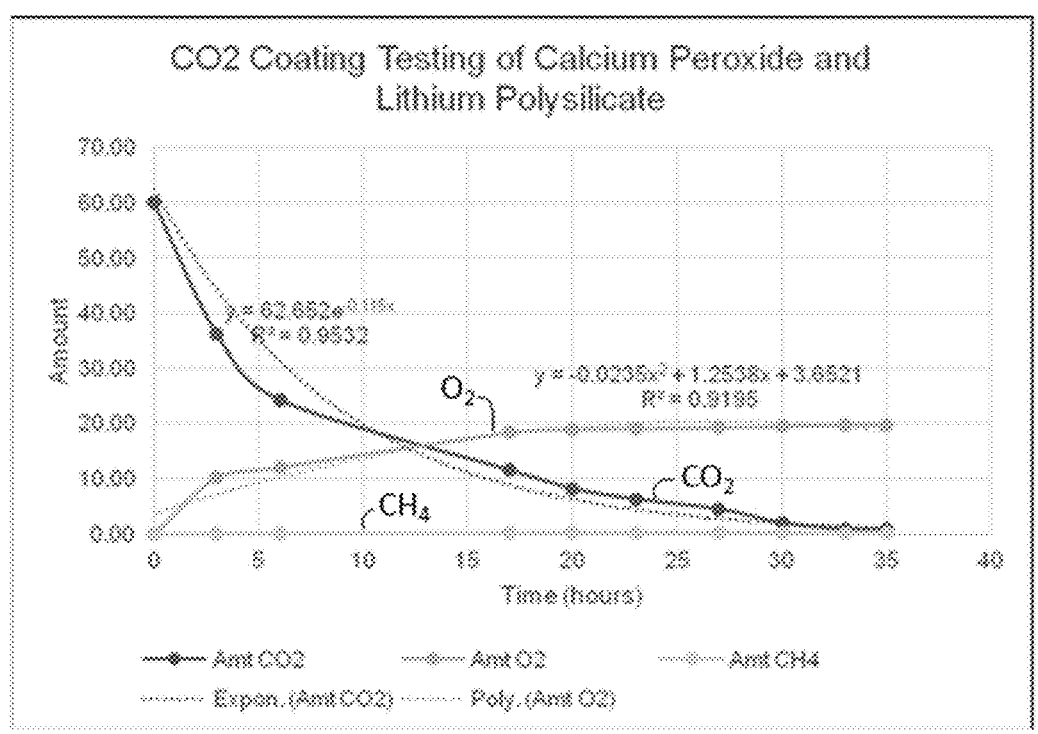
FIG. 4 depicts gas analysis results from a $CO_2$-exposure test of a non-limiting example of concrete coated with lithium polysilicate and calcium peroxide.

As shown in FIGS. 3 and 4, the amount of $CO_2$ decreased exponentially as a function of time whereas the amount of $O_2$ increased. Both gases also demonstrate a leveling-off effect. $CO_2$ levels approached zero but never quite reached that value. The amount of $O_2$ leveled off as it approached 20 vol. %. The leveling-off effect may means that the amount of oxygen produced is dependent on the amount of available carbon dioxide. As the reaction proceeds, less carbon dioxide is present, and therefore less oxygen is produced.

Unexpectedly, the LPS and calcium peroxide coating initially took up $CO_2$ much faster than the LPS and lime coating. This is shown by the slope value of each equation, with the slope of the LPS and calcium peroxide being significantly larger than that of the LPS and lime (62.652 compared to 46.95). The reason this is unexpected is because calcium peroxide must first be converted to lime to react with the $CO_2$.

Example 5

Absorption of $CO_2$ by Concrete Over Accelerated Time Testing—3-day Purge

Additional studies were performed on a coating containing lithium polysilicate and calcium peroxide. Calcium peroxide, when exposed to $CO_2$ in proper humidity levels of near 50%, reacts with $CO_2$ to form lime and release oxygen. The lime is subsequently exposed to the lithium polysilicate, forming C—S—H and leading again to $CO_2$ absorption and oxygen release. Accordingly, this coating presents two opportunities for the absorption of $CO_2$ and production of oxygen.

The objective of this study was to assess how much of the $CO_2$ absorbed was the result of calcium peroxide converting into lime, and how much was resulting from the production of C—H—S. Concrete samples were prepared with various coatings and placed in a gas chamber at or near 100% $CO_2$ by volume. $CO_2$, $O_2$, and humidity levels were then monitored. Since $CO_2$ absorption is a function of the $CO_2$ vol. % in the chamber, the chamber was maintained at high $CO_2$ levels by "purging" the gas chamber every 24 hours (i.e., evacuating and then refilling chamber to near 100% $CO_2$). These tests were run for three days.

Sample 1 had a coating of calcium peroxide and water (see Table 1). This sample was used to measure the effects of only the reaction where calcium peroxide uses $CO_2$ to convert into lime. Sample 2 had a coating of lithium polysilicate, calcium peroxide and water. This sample indicated the results of the tandem reactions described above. The samples were compared to each other and to two controls: an uncoated cement sample in the chamber, and gas levels in a gas chamber with concrete sample. The concrete used in this testing was prepared using Portland cement, and 2 in. by 2 in. by 2 in. cube concrete samples were prepared for coating, as in Example 6. As such, 24 square inches of surface area are coated per concrete sample.

TABLE 1

Sample composition

| sample | $CaO_2$ (g) | LPS (g) | water (g) |
| --- | --- | --- | --- |
| 1 | 100 | 0 | 100 |
| 2 | 100 | 20 | 100 |

Figure 5:
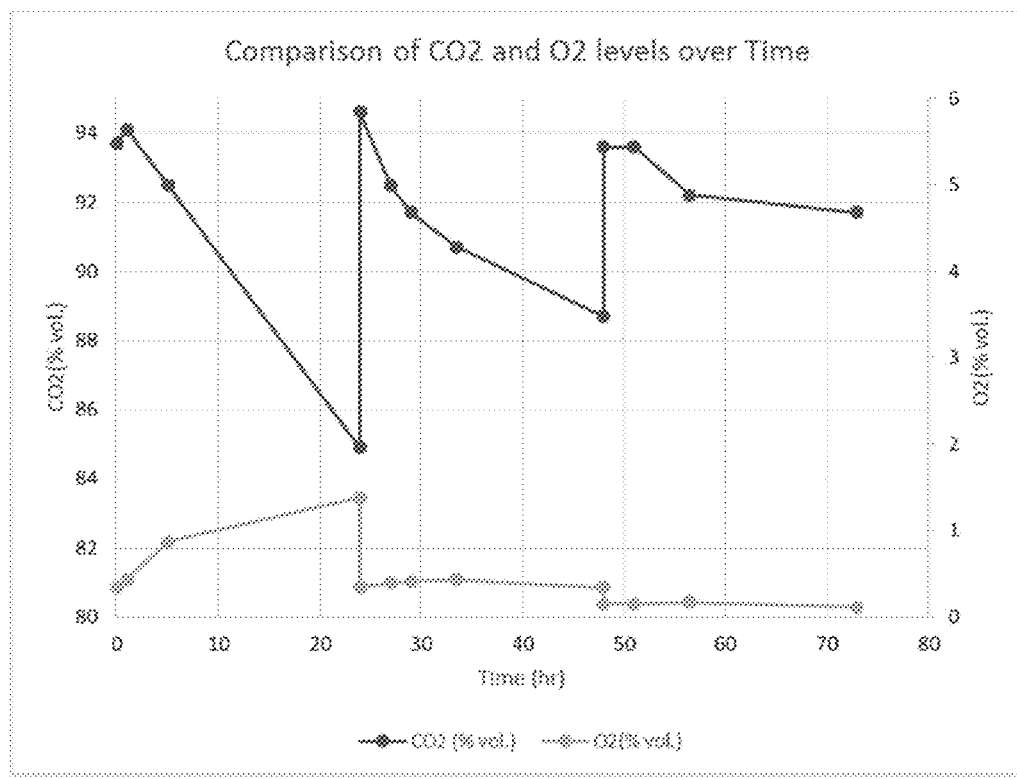
FIG. 5 depicts gas analysis results from a $CO_2$ three-day purge experiment using a non-limiting example of concrete coated with calcium peroxide.

Results for Sample 1 are shown in Table 2 and FIG. 5. Spikes in the data at the 24- and 48-hour timepoints indicate when purges were performed prior to re-measurement of gas levels. Between purges, the $CO_2$ levels drop, indicating absorption, and $O_2$ levels rise, indicating production.

TABLE 2

Sample 1: concrete with coating containing $CaO_2$ and water (1:1 ratio)

| time (h) | $CO_2$ (vol. %) | $O_2$ (vol. %) | humidity (%) |
| --- | --- | --- | --- |
| 0 | 93.7 | 0.35 | 1 |
| 1 | 94.1 | 0.43 | 10 |
| 5 | 92.5 | 0.87 | 62 |
| 24 | 84.9 | 1.38 | 55 |
| P* 24 | 94.6 | 0.35 | 33 |
| 27 | 92.5 | 0.39 | 50 |
| 29 | 91.7 | 0.41 | 50 |
| 33.5 | 90.7 | 0.43 | 51 |
| 48 | 88.7 | 0.34 | 52 |
| P* 48 | 93.6 | 0.15 | 40 |
| 51 | 93.6 | 0.15 | 48 |

TABLE 2-continued

Sample 1: concrete with coating containing $CaO_2$ and water (1:1 ratio)

| time (h) | $CO_2$ (vol. %) | $O_2$ (vol. %) | humidity (%) |
| --- | --- | --- | --- |
| 56.5 | 92.2 | 0.17 | 52 |
| 73 | 91.7 | 0.11 | 52 |

*Second reading performed after purge (P) at this timepoint.

Figure 6:
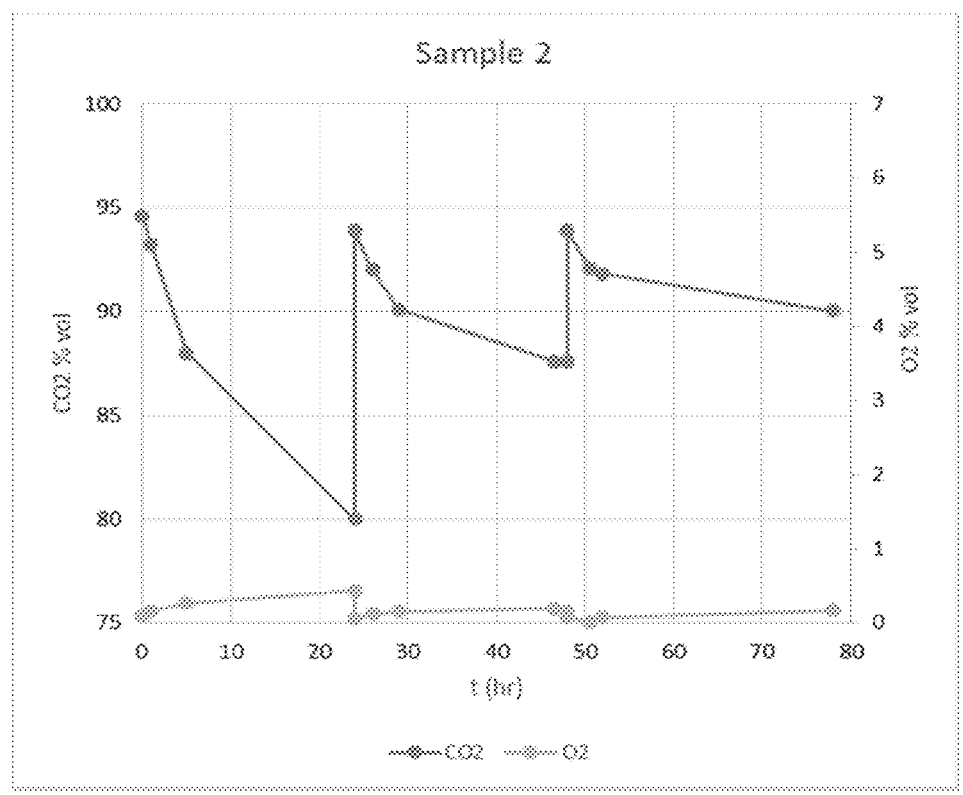
FIG. 6 depicts gas analysis results from a $CO_2$ three-day purge experiment using a non-limiting example of concrete coated with lithium polysilicate and calcium peroxide.

Results for Sample 2 are shown in Table 3 and FIG. 6.

TABLE 3

Sample 2: concrete with coating containing LPS, $CaO_2$ and water

| time (h) | $CO_2$ (vol. %) | $O_2$ (vol. %) | humidity (%) |
| --- | --- | --- | --- |
| 0 | 94.6 | 0.09 | 16 |
| 1 | 93.2 | 0.16 | 44 |
| 5 | 88 | 0.26 | 75 |
| 24 | 80 | 0.43 | 69 |
| P* 24 | 93.9 | 0.06 | 54 |
| 26 | 92 | 0.12 | 70 |
| 29 | 90.1 | 0.15 | 75 |
| 46.5 | 87.6 | 0.19 | 73 |
| 48 | 87.6 | 0.16 | 73 |
| 48 | 93.9 | 0.07 | 45 |
| 50.5 | 92.1 | 0.02 | 62 |
| 52 | 91.8 | 0.07 | 65 |
| 78 | 90 | 0.17 | 70 |

*Second reading performed after purge (P) at this timepoint.

Comparison of the data indicates that the coating containing lithium polysilicate and calcium peroxide, with its capability to absorb $CO_2$ more than once, resulted in a larger overall consumption of $CO_2$ compared to a coating with just calcium peroxide. For example, during the first day of the testing, Sample 1 converted 8.8 vol. % of $CO_2$ (23.672 L) whereas Sample 2 converted 14.6 vol. % of $CO_2$ (39.274 L). This is a difference of 15.602 L of $CO_2$.

Over the entire 3-day period (see Table 4), the coating on Sample 1 converted a total of 44.654 L (1.93 moles) of $CO_2$ per 24 square inches of coated concrete. Sample 2 converted a total of 2.85 moles of $CO_2$ per 24 square inches of coated concrete in the same time period. Notably, this 3-day period in the gas chamber is equivalent to 6 years in ambient conditions.

TABLE 4

Gas analysis over 3-day period.

| Sample | $CaO_2$ (g) | LPS (g) | $H_2O$ (g) | $CO_2$ absorbed (L) | $CO_2$ absorbed (mol) | Peak stress (psi) | Peak load (lb) |
| --- | --- | --- | --- | --- | --- | --- | --- |
| 1 | 100 | 0 | 100 | 44.654 | 1.93 | 757 | 3028 |
| 2 | 100 | 20 | 100 | 66.712 | 2.85 | 597 | 2388 |
| 3 | 0 | 0 | 0 | | | | |

Example 6

$CO_2$ Three-Day Purge

The objective of this experiment was to examine the limit of $CO_2$ absorption.

Concrete samples were prepared according to the following procedure. Water (100 mL) was added to Portland cement (300 g), and the resultant mixture was stirred well. The mixture was poured into 2 in.×2 in.×2 in. metal boxes and allowed to sit for 2 days. After the two-day period, the samples from each box were removed and allowed to sit in ambient air for another two days prior to further use.

Gas chamber used in these sealed chamber experiments had a volume of 9.5 cubic feet or 269 liters.

The coatings used on the samples were either calcium peroxide (a lime precursor) mixed with lithium polysilicate or lime mixed with lithium polysilicate. Both coatings were mixed at a 1:1 ratio. The mass of the coating per sample was 200 g. Each side of a 2 in.×2 in.×2 in. sample was coated, though the sample rested on one side.

The concrete samples were coated with the desired coating and then placed in an air tent (gas chamber) with as close to 100% $CO_2$ as possible. Over the course of the following three days, the levels of $CO_2$ and $O_2$ were measured. Once a day over the course of the three days, the air tent was purged of all oxygen and placed in a nearly 100% $CO_2$ environment. This daily refill of $CO_2$ ensured that excess $CO_2$ was always available for reaction with the samples. The measurements were analyzed in order to determine if and when the reaction was exhausted. The experiment with lithium polysilicate and lime was performed twice (see "first test" and "second test" below). Results from the gas analyses are presented in Tables 5-7.

TABLE 5

Lithium polysilicate and calcium peroxide

| T (h) | $CO_2$ (vol. %) | $O_2$ (vol. %) |
|---|---|---|
| 0 | 79.1 | 3.87 |
| 1 | 78.2 | 4.39 |
| 4 | 68.5 | 6.92 |
| 20 | 66.1 | 8.1 |
| 22 | 65.9 | 8.16 |
| 24 | 65.5 | 8.26 |
| P* 24 | 95.4 | 0.66 |
| 26 | 91.7 | 1.36 |
| 28 | 91.9 | 1.45 |
| 32 | 91.3 | 1.63 |
| 44 | 89 | 2.34 |
| 48 | 88.8 | 2.37 |
| 50 | 88.1 | 2.55 |
| 52 | 87.6 | 2.65 |
| 56 | 87.6 | 2.77 |
| 68 | 84.4 | 3.47 |
| 72 | 84.6 | 3.53 |
| 75 | 83.8 | 3.62 |

*Second reading performed after purge (P) at this timepoint.

TABLE 6

Lithium polysilicate and lime. (first test)

| T (h) | $CO_2$ (vol. %) | $O_2$ (vol. %) |
|---|---|---|
| 0 | 96.8 | 0.57 |
| 1 | 94.5 | 1.06 |
| 6 | 81.2 | 3.82 |
| 18 | 78.1 | 4.71 |
| 21 | 77.1 | 4.52 |
| 24 | 75.9 | 4.67 |
| P 24 | 95.5 | 0.48 |
| 25 | 83.8 | 2.89 |
| 30 | 82.4 | 3.18 |
| 42 | 81.6 | 3.42 |
| 45 | 81.6 | 3.49 |
| 48 | 80.7 | 3.58 |

*Second reading performed after purge (P) at this timepoint.

TABLE 7

Lithium polysilicate and lime (second test)

| T (h) | $CO_2$ (vol. %) | $O_2$ (vol. %) |
|---|---|---|
| 0 | 96.8 | 0.98 |
| 2 | 94.7 | 1.21 |
| 4 | 94.1 | 1.36 |
| 20 | 91.2 | 1.87 |
| 22 | 90.7 | 1.83 |
| P* 24 | 47.6 | 10.81 |
| 25 | 39.6 | 12.44 |
| 28 | 38.5 | 12.6 |
| 44 | 37.4 | 12.82 |
| 46 | 33.5 | 13.67 |
| 48 | 31.2 | 14.12 |
| 48.5 | 30.8 | 14.13 |
| 50 | 27 | 14.97 |
| 52 | 26.9 | 15.01 |
| 69 | 26.2 | 15.24 |
| 72 | 26.2 | 15.26 |
| 74 | 26.1 | 15.23 |

*Purge (P) was performed at this timepoint.

With respect to the first test with lithium polysilicate and lime (see Table 6), the $CO_2$ level dropped from 96.8% down to 75.9% after the first 24 hours. In the second 24-hour period, the $CO_2$ level dropped from 95.5% to 80.7%. This means the $CO_2$ absorption was slowed down by 29.2%.

Figure 7:
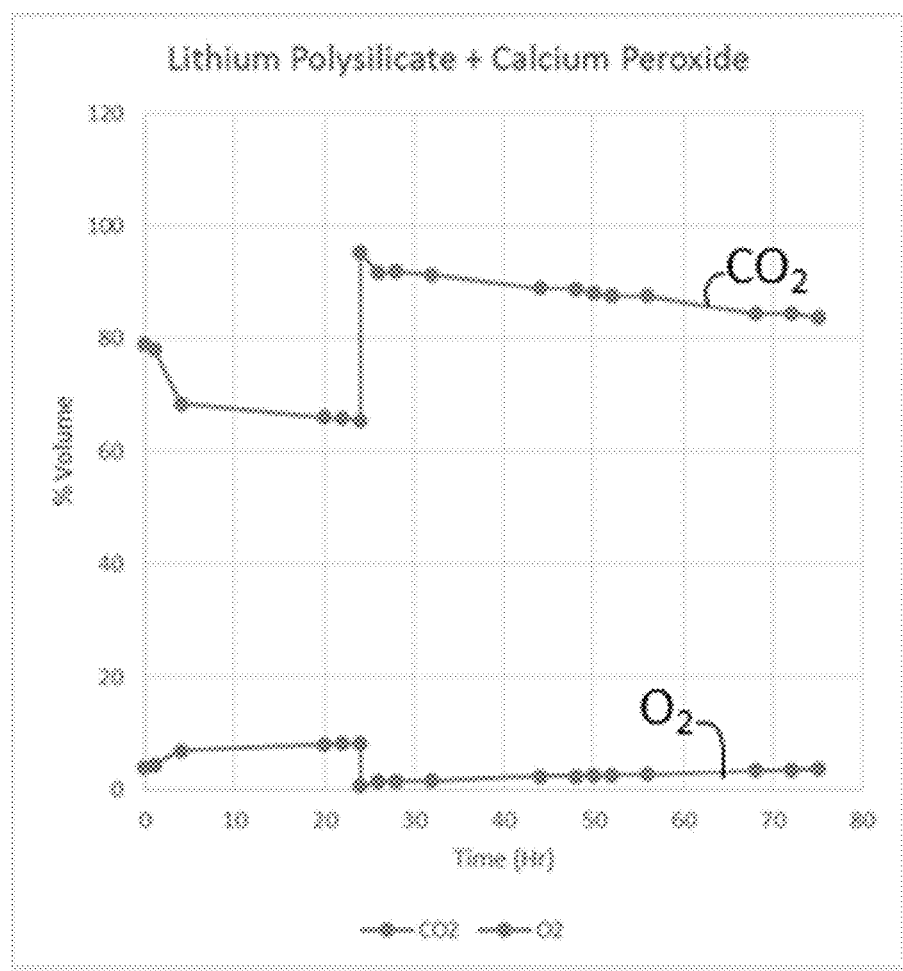
FIG. 7 depicts gas analysis results from a $CO_2$ three-day purge experiment using a non-limiting example of concrete coated with calcium peroxide and lithium polysilicate.

With respect to the test with lithium polysilicate and calcium peroxide, $CO_2$ absorption started quickly in the first few hours but quickly slowed down (see Table 5 and FIG. 7). After the upwards spike where the purge took place there was a brief increase in reaction speed but that slowed down as well. The steepening of the slope is evidence of an accelerated reaction. This is due to the reaction quickening in the presence of ample $CO_2$. This coating seemed to have slowed down very shortly into the experiment. Also the overall pace of the reaction was slower than that of the previous testing with lithium polysilicate and lime serving as the coating. However there appears to be correlation between $CO_2$ and $O_2$ levels, implying a reactant-product relationship as expected. This coating could prove useful if it is determined that it will last significantly longer to overcome its slower pace.

Figure 8:
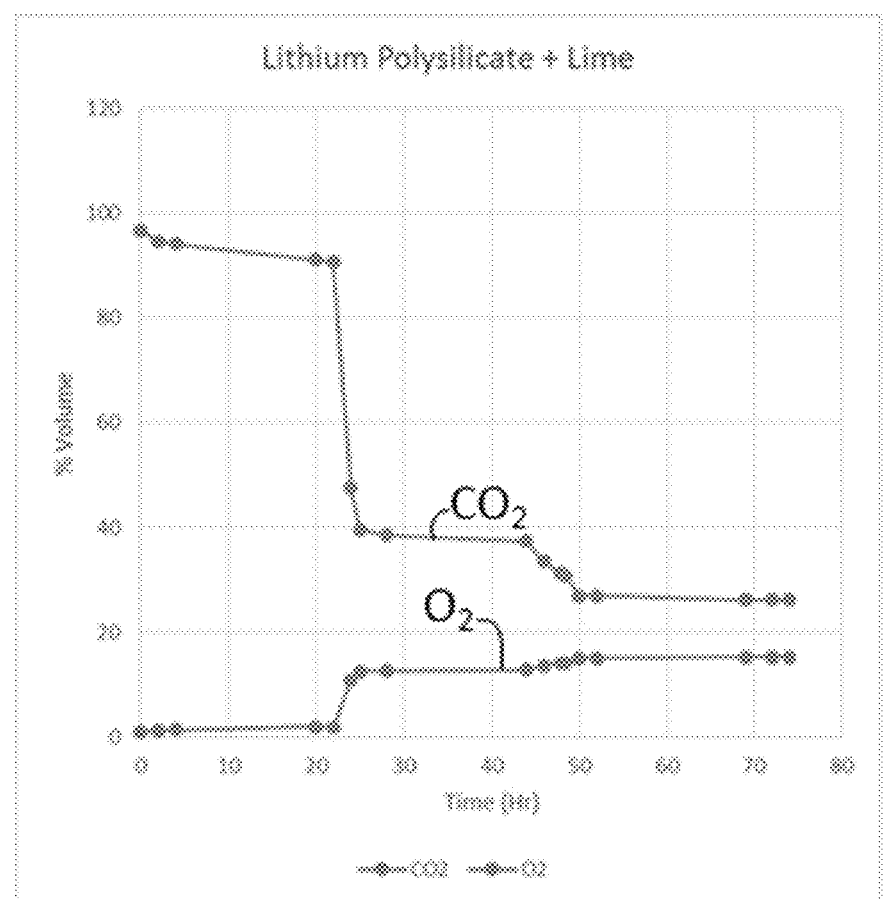
FIG. 8 depicts gas analysis results from a $CO_2$ three-day purge experiment using a non-limiting example of concrete coated with lithium polysilicate and lime.

The experiment with the lithium polysilicate and lime coating was repeated. It was expected to see results similar to that of the first test. However, this test seemed to run into multiple problems. Firstly, during the first purge of the testing, the tank ran out of $CO_2$ and the chamber could not be refilled to 100% $CO_2$ (see Table 7 and FIG. 8). Secondly, the rate of $CO_2$ absorption during the first 24 hours was slower than that of the first test and even of the lithium polysilicate and calcium peroxide experiment. The first test and second test both started with identical percent volumes of $CO_2$ so the reaction should have proceeded at the same rate. Several factors may have influenced the rate of reaction. One such factor may be the amount of coating applied to the concrete sample. Further testing will have the amount of coating used being more closely monitored. Another possible factor may be the amount of humidity in the air. It was noticed that in every test and after every purge there was 50% humidity or less. At the end of every test, that level increased to around 75%. It may be possible that the reaction is being repressed by too much humidity.

Example 7

Effects of $CO_2$ Conversion with the Addition of Additives INSIDE the Cement Mortar without Holes Concrete samples were prepared according to the following procedure. Water (100 mL) was added to Portland cement (300 g), and the resultant mixture was stirred well. The mixture was poured into 2 in.×2 in.×2 in. metal boxes and allowed to sit for 2 days. After the two-day period, the samples from each box were removed and allowed to sit in ambient air for another two days prior to further use.

Gas chamber used in these sealed chamber experiments had a volume of 9.5 cubic feet or 269 liters.

The mass of the coating per sample was 200 g. Each side of a 2 in.×2 in.×2 in. sample was coated, though the sample rested on one side.

Seven samples for this experiment were prepared (Table 8).

TABLE 8

Sample composition.

| sample | volume (mL) | total mass (g) | $CaO_2$ (g) | LPS (g) | lime (g) | concrete mix (g) | water (g) |
|---|---|---|---|---|---|---|---|
| 1 | 150 | 380 | 0 | 0 | 0 | 345 | 35 |
| 2 | 180 | 322 | 52.2 | 0 | 0 | 210.3 | 59.6 |
| 3 | 120 | 332 | 7 | 0 | 0 | 295 | 30.0 |
| 4 | 145 | 331 | 6.3 | 6.3 | 0 | 279 | 39.4 |
| 5 | 150 | 331 | 6.9 | 6.9 | 6.9 | 274.2 | 36.1 |
| 6 | 145 | 289 | 11.3 | 11.3 | 11.3 | 209.3 | 45.8 |
| 7 | 145 | 314 | 13.7 | 13.7 | 0 | 246.6 | 40.1 |

Samples were exposed to $CO_2$ and then assessed using a compression test and a phenolphthalein test. During the $CO_2$ exposure, the percent decrease of $CO_2$ and the percent increase of $O_2$ were measured. Percent humidity levels in the gas chamber were also recorded. The compression test results revealed the maximum peak load for the samples, indicating how the strength of each sample was affected by the addition of the additives. During the phenolphthalein test, the sample was first broken in half so that drops of phenolphthalein could be dispersed in the middle of the sample. Locations with no color change indicated the occurrence of a reaction (i.e., conversion of $CO_2$ to $O_2$).

Table 9 shows the % $CO_2$ and % $O_2$ in the chamber up to 52 hours. It also shows the % humidity inside the $CO_2$-filled chamber. The $CO_2$ levels decreased by 5.47% and the $O_2$ levels increased by 142.7%. This is interesting because there were no additives to this sample. Three possibilities may explain these results. Perhaps one of the seals on the chamber was not working properly and allowed $CO_2$ to seep out and $O_2$ to seep in. Alternatively, some other unknown reaction was taking place inside of the chamber. Else, an untreated concrete sample was capable of reducing the level of $CO_2$ and increasing the level of $O_2$.

TABLE 9

$CO_2$ test for Sample 1 (Control sample)

| time (h) | humidity (%) | $CO_2$ (vol. %) | $O_2$ (vol. %) |
|---|---|---|---|
| 0 | 21 | 93.2 | 1.03 |
| 0.5 | 17 | 91.9 | 1.06 |
| 52 | 43 | 88.1 | 2.5 |

When the compression test was performed on sample 1, the maximum peak load of the sample was 2790.16 lb.

When drops of phenolphthalein were dispersed on the inside of the concrete sample, no color change was observed. This indicates that reaction was occurring at all areas of the sample. This is confusing because there were no additives to the concrete sample.

Table 10 shows % $CO_2$ and % $O_2$ in a chamber filled with $CO_2$ for up to 48.75 hours. It also shows the % humidity in the $CO_2$-filled chamber. Over the period of 48.75 hours, $CO_2$ levels decreased by 12.0% and $O_2$ levels increased by 131%. The % humidity remained constant at 50%.

TABLE 10

$CO_2$ test for Sample 2

| time (h) | humidity (%) | $CO_2$ (vol. %) | $O_2$ (vol. %) |
|---|---|---|---|
| 0 | 18 | 90.7 | 2 |
| 23.75 | 50 | 83.3 | 4.28 |
| 24.75 | 50 | 83.4 | 4.22 |
| 30.25 | 50 | 81.9 | 4.46 |
| 48.75 | 50 | 79.8 | 4.62 |

No compression test was performed on sample 2. The sample was very brittle when manually handled. As such, sample 2 was very weak.

When drops of phenolphthalein were dispersed onto the inside of the concrete sample, the outside edges turned purple. This meant that the chemical reaction of converting $CO_2$ to $O_2$ happened in the middle of the concrete sample versus on the outside edges: $CO_2$ was being absorbed in the middle of the sample and then working its way out.

Table 11 shows % $CO_2$ and % $O_2$ in a chamber filled with $CO_2$ for up to 47.25 hours. It also shows the % humidity in the $CO_2$ filled chamber. Over the period of 47.25 hours, $CO_2$ levels decreased by 9.75% and $O_2$ levels increased by 63%. The % humidity remained constant at 37%.

TABLE 11

$CO_2$ test for Sample 3

| time (h) | humidity (%) | $CO_2$ (vol. %) | $O_2$ (vol. %) |
|---|---|---|---|
| 0 | 24 | 93.3 | 1.35 |
| 1.25 | 17 | 91.6 | 1.39 |
| 22 | 37 | 88.5 | 1.9 |
| 24.5 | 37 | 88.1 | 1.92 |
| 26.5 | 37 | 88.1 | 1.91 |
| 46.5 | 37 | 84.4 | 2.2 |
| 47.25 | 37 | 84.2 | 2.2 |

The maximum peak load for sample 3 was 3001.6 lb. over 0.25 in. This is greater than the peak load of sample 1. This indicates that the additive did indeed improve the strength of the concrete.

When drops of phenolphthalein were dispersed onto the middle of the sample, there was very little purple observed. This means most of the sample participated in the reaction of concerting $CO_2$ to $O_2$. However, only a small portion of the sample was tested because that was all that remained after doing the compression test. It cannot be decisively concluded if there is a pattern in which the $CO_2$ was absorbed.

Table 12 shows % $CO_2$ and % $O_2$ in a chamber filled with $CO_2$ for up to 50.5 hours. It also shows the % humidity in the $CO_2$ filled chamber. Over the period of 50.5 hours, $CO_2$ levels decreased by 9.84% and $O_2$ levels increased by 112%. The % humidity did not stay constant overtime, but varied between 21-33%.

TABLE 12

$CO_2$ test for Sample 4

| time (h) | humidity (%) | $CO_2$ (vol. %) | $O_2$ (vol. %) |
|---|---|---|---|
| 0 | 19 | 91.5 | 1.32 |
| 5.5 | 32 | 88.1 | 1.63 |
| 22 | 30 | 87.4 | 1.98 |
| 23 | 27 | 86.9 | 2 |
| 25 | 21 | 86.9 | 2.11 |
| 50.5 | 33 | 82.5 | 2.8 |

The maximum peak load for sample 4 was 347.5 lb. over 0.25 in. This is much lower than the peak load of sample 1. This indicates that this combination of additives decreased the strength of the concrete dramatically.

When drops of phenolphthalein were dispersed onto the inside of the sample, purple color was observed scattered throughout the sample. The stronger colored purple was around all of the edges. The lighter colored purple was scattered throughout the middle of the sample.

Table 13 shows % $CO_2$ and % $O_2$ in a chamber filled with $CO_2$ for up to 48.5 hours. It also shows the % humidity in the $CO_2$ filled chamber. Over the period of 48.5 hours, $CO_2$ levels decreased by 7.24% and $O_2$ levels increased by 207%. The % humidity did not stay constant; however, it stayed between 32-38%.

TABLE 13

$CO_2$ test for Sample 5

| time (h) | humidity (%) | $CO_2$ (vol. %) | $O_2$ (vol. %) |
|---|---|---|---|
| 0 | 21 | 91.2 | 0.81 |
| 4.25 | 32 | 89.6 | 1.13 |
| 24 | 36 | 87.9 | 1.84 |
| 25 | 34 | 87.7 | 1.79 |
| 30 | 36 | 86.9 | 2.01 |
| 48.5 | 38 | 84.6 | 2.49 |

The maximum peak load for sample 5 was 474.5 lb. over 0.25 in. This value is much lower than the peak load value for sample 1. This indicates that this combination of additives decreased the strength of the concrete sample dramatically.

When drops of phenolphthalein were dispersed onto the inside of the sample, no common pattern was observed. Instead, purple color was scattered throughout the sample. However, there was not much purple, and the purple that was visible was very light in color. This indicates that most of the sample participated in the reaction of converting $CO_2$ to $O_2$.

Table 14 shows % $CO_2$ and % $O_2$ in a chamber filled with $CO_2$ for up to 48 hours. It also shows the % humidity in the $CO_2$ filled chamber. Over the period of 48 hours, $CO_2$ levels decreased by 12.6% and $O_2$ levels increased by 157%. The % humidity did not stay constant; however, it stayed between 34-37%.

TABLE 14

$CO_2$ test for Sample 6

| time (h) | humidity (%) | $CO_2$ (vol. %) | $O_2$ (vol. %) |
|---|---|---|---|
| 0 | 21 | 92.02 | 1.05 |
| 0.5 | 16 | 90.8 | 1.1 |
| 2.25 | 17 | 90.3 | 1.17 |
| 19.5 | 35 | 85.8 | 1.92 |
| 23.25 | 35 | 85.3 | 1.96 |
| 24.25 | 35 | 84.7 | 2.03 |
| 25.5 | 35 | 84.4 | 2.04 |
| 47.25 | 37 | 80.8 | 2.74 |
| 48 | 34 | 80.6 | 2.7 |

The maximum peak load for sample 6 was 332.8 lb. over 0.25 in. This value is much lower than the peak load value for sample 1. This indicates that this combination of additives decreased the strength of the concrete sample dramatically.

When drops of phenolphthalein were dispersed onto the inside of the concrete sample, little spots of purple were observed. The little spots of purple were scattered throughout the sample, which has seemed to be a common theme for samples made with the addition of lithium polysilicate.

Table 15 shows % $CO_2$ and % $O_2$ in a chamber filled with $CO_2$ for up to 48 hours. It also shows the % humidity in the $CO_2$ filled chamber. Over the period of 48 hours, $CO_2$ levels decreased by 8.86% and $O_2$ levels increased by 373%. There were not enough data points to conclude if the % humidity stayed constant.

TABLE 15

$CO_2$ test for Sample 7

| time (h) | humidity (%) | $CO_2$ (vol. %) | $O_2$ (vol. %) |
|---|---|---|---|
| 0 | 24 | 92.5 | 0.52 |
| 24 | 32 | 87.9 | 1.79 |
| 48 | 35 | 84.3 | 2.46 |

The maximum peak load for sample 7 was 1785.9 lb. over 0.25 in. This value is lower than the peak load value for sample 1. This indicates that this combination of additives decreased the strength of the concrete sample.

After dispersing drops of phenolphthalein onto the inside of the sample, very little purple color appeared. This means most of the sample participated in the reaction. However, the purple that was observed was scattered throughout the entire sample. The purple in the middle was much lighter than that of the purple on the outside edges. This indicates that the middle reacted more that the outside edges of the concrete sample.

Multiple experiments were run on each concrete sample to evaluate its performance at reducing $CO_2$ and producing $O_2$. After all experiments were complete for each concrete sample made, the results were compared (see Table 16). After comparing the results, concrete samples 3 and 7 had the best performance. These samples performed just as well at reducing $CO_2$ levels as all of the other samples, but they also had the best strength.

TABLE 16

Comparison of Results

| sample | additive(s)* | % $CO_2$ decrease | % $O_2$ increase | peak load (lb) | % strength increase |
|---|---|---|---|---|---|
| 1 | None | 5.47*<br>4.40** | 142.7*<br>94.2** | 2790.16 | N/A |

TABLE 16-continued

Comparison of Results

| sample | additive(s)* | % $CO_2$ decrease | % $O_2$ increase | peak load (lb) | % strength increase |
|---|---|---|---|---|---|
| 2 | $CaO_2$ | 12 | 131 | N/A | N/A |
| 3 | $CaO_2$ | 9.75 | 63 | 3001.6 | 7.57 |
| 4 | $CaO_2$, LPS | 9.84 | 112 | 347.5 | −87.5 |
| 5 | $CaO_2$, LPS, lime | 7.24 | 207 | 474.5 | −83 |
| 6 | $CaO_2$, LPS, lime | 12.6 | 157 | 332.8 | −88.07 |
| 7 | $CaO_2$, LPS | 8.86 | 373 | 1785.9 | −36 |

*Values assessed at 52 hour timepoint
**Values estimated at 48 hour timepoint

Example 8

Effects of $CO_2$ Conversion with the Addition of Additives INSIDE the Cement with Holes in the Cement Mortar Concrete samples were prepared according to the following procedure. Water (100 mL) was added to Portland cement (300 g), and the resultant mixture was stirred well. The mixture was poured into 2 in.×2 in.×2 in. metal boxes. The concrete sat for 5 minutes, then nine 1-mL wide pipettes were pushed into the sample to make holes and left there for 30 minutes before being removed. The samples were taken out of metal box 4 days later for testing.

Gas chamber used in these sealed chamber experiments had a volume of 9.5 cubic feet or 269 liters.

The mass of the coating per sample was 200 g. Each side of a 2 in.×2 in.×2 in. sample was coated, though the sample rested on one side.

Six samples for this experiment were prepared (Table 17). Nine holes were made entirely through each concrete sample. The holes were 0.122 inch or 3,098 microns in diameter.

TABLE 17

Sample Compositions

| sample | $H_2O$ (g) | cement (g) | $CaO_2$ (g) | LPS (g) | lime (g) |
|---|---|---|---|---|---|
| 1 | 120 | 300 | none | none | None |
| 2 | 120 | 288 | 12 | none | None |
| 3 | 115 | 276 | 12 | 5 | 12 |
| 4 | 120 | 300 | 12 | 12 | 12 |
| 5 | 120 | 276 | 24 | none | None |
| 6 | 130 | 290 | 20 | 10 | 10 |

Samples were exposed to $CO_2$ and then assessed using a compression test and a phenolphthalein test. During the $CO_2$ exposure, the percent decrease of $CO_2$ and the percent increase of $O_2$ were measured. Percent humidity levels in the chamber were also recorded. The compression test results revealed the maximum peak load for the samples, indicating how the strength of each sample was affected by the addition of the additives. During the phenolphthalein test, the sample was first broken in half so that drops of phenolphthalein could be dispersed in the middle of the sample. Locations with no color change indicated the occurrence of a reaction (i.e., conversion of $CO_2$ to $O_2$).

Table 18 shows the % $CO_2$ and % $O_2$ in the chamber up to 46.5 hours. It also shows the % humidity inside the chamber. The $CO_2$ levels decreased by 11.1% and the $O_2$ levels increased by 59.5%. This is interesting because there were no additives to this sample. Three possibilities may explain these results. Perhaps one of the seals on the chamber was not working properly and allowed $CO_2$ to seep out and $O_2$ to seep in. Alternatively, some other unknown reaction was taking place inside of the chamber. Else, an untreated concrete sample was capable of reducing the level of $CO_2$ and increasing the level of $O_2$.

TABLE 18

$CO_2$ test for Sample 1

| time (h) | humidity (%) | $CO_2$ (vol. %) | $O_2$ (vol. %) |
|---|---|---|---|
| 0 | 23 | 91.8 | 0.84 |
| 1 | 19 | 90 | 0.88 |
| 1.5 | 25 | 88.7 | 0.97 |
| 4.5 | 40 | 86.4 | 1.16 |
| 23 | 40 | 83.8 | 1.46 |
| 24 | 40 | 83.4 | 1.28 |
| 46.5 | 40 | 81.6 | 1.34 |

The maximum peak load of the sample was 3071.2 lb.

After phenolphthalein was dispersed onto the cement sample 1, most of the sample turned purple. The spots that had no color change were on the outside edges and in between the holes that were made into the sample. This indicates that this sample only underwent the reaction of converting $CO_2$ to $O_2$ on the outside edges and in the holes.

Table 19 shows % $CO_2$ and % $O_2$ in a chamber filled with $CO_2$ for up to 49.75 hours. It also shows the % humidity in the $CO_2$ filled chamber. Over the period of 49.75 hours, $CO_2$ levels decreased by 12.8% and $O_2$ levels increased by 418%. The % humidity stayed between 43-49%.

TABLE 19

$CO_2$ test for Sample 2

| time (h) | humidity (%) | $CO_2$ (vol. %) | $O_2$ (vol. %) |
|---|---|---|---|
| 0 | 28 | 91.4 | 0.51 |
| 0.75 | 56 | 89.2 | 0.56 |
| 24.5 | 49 | 83.5 | 2.09 |
| 25.25 | 49 | 83.5 | 1.88 |
| 49.75 | 43 | 79.7 | 2.64 |

The maximum peak load for sample 2 was 4905.1 lb. over 0.25 in. This peak load was greater than the peak load of the control sample by about 1900 lb. This indicates that the strength of cement increases with the addition of calcium peroxide.

After phenolphthalein was dispersed onto the cement sample, the purple color was a little scattered. Both the outside edges and in the holes had no color change, indicating a reaction of converting $CO_2$ to $O_2$. However, the purple that did appear was much lighter than that of sample 1 and the color was spotty. This indicates that some spots in the middle did also react in the conversion of $CO_2$ to $O_2$.

Table 20 shows % $CO_2$ and % $O_2$ in a chamber filled with CO2 for up to 47.25 hours. It also shows the % humidity in the $CO_2$ filled chamber. Over the period of 47.25 hours, $CO_2$ levels decreased by 11.7% and $O_2$ levels increased by 143%. The % humidity stayed between 72-76%.

TABLE 20

CO$_2$ test for Sample 3

| time (h) | humidity (%) | CO$_2$ (vol. %) | O$_2$ (vol. %) |
|---|---|---|---|
| 0 | 17 | 92.3 | 0.79 |
| 0.75 | 30 | 90.3 | 0.8 |
| 21 | 72 | 85.8 | 1.53 |
| 47.25 | 76 | 81.5 | 1.92 |

The maximum peak load for sample 3 was 4075.3 lb. over 0.25 in. This peak load was greater than the peak load of the control sample by about 1000 lb. This indicates that the addition of all three additives in this amount increases the strength of the sample.

After phenolphthalein was dispersed onto the cement sample, the sample underwent a color change. The outside edges and insides of the holes did not change color, however, indicating a reaction of converting CO$_2$ to O$_2$. The purple that was visible was lighter in color than that of sample 1, but was a solid purple. It was not spotty as in sample 2, indicating that the middle of the sample did not participate in the reaction of converting CO$_2$ to O$_2$.

Table 21 shows % CO$_2$ and % O$_2$ in a chamber filled with CO$_2$ for up to 49.25 hours. It also shows the % humidity in the CO$_2$ filled chamber. Over the period of 49.25 hours, CO$_2$ levels decreased by 9.84% and O$_2$ levels increased by 126%. The % humidity stayed between 73-78%.

TABLE 21

CO$_2$ test for Sample 4

| time (h) | humidity (%) | CO$_2$ (vol. %) | O$_2$ (vol. %) |
|---|---|---|---|
| 0 | 53 | 91.5 | 0.57 |
| 18.75 | 78 | 88.1 | 0.98 |
| 21 | 78 | 87.4 | 1.04 |
| 25.25 | 73 | 86.2 | 1.09 |
| 26 | 75 | 85.2 | 1.09 |
| 42.5 | 78 | 83.4 | 1.27 |
| 49.25 | 77 | 82.5 | 1.29 |

The maximum peak load for sample 4 was 3667.3 lb. over 0.25 in. This value was greater than the peak load value of the control sample. This indicates that the addition of all three additives in this amount increases the strength of the cement sample.

After phenolphthalein was dispersed onto the cement sample, most of the sample turned purple. Both the outside edges and the middle of the holes did not change color, an indication that those area underwent the reaction of converting CO$_2$ to O$_2$. The purple that was visible was a darker purple like sample 1. However, the purple was a little bit spotty, indicating that some of the middle of the sample did in fact undergo the reaction of converting CO$_2$ to O$_2$.

Table 22 shows % CO$_2$ and % O$_2$ in a chamber filled with CO$_2$ for up to 48 hours. It also shows the % humidity in the CO$_2$ filled chamber. Over the period of 48 hours, CO$_2$ levels decreased by 12.07% and O$_2$ levels increased by 210%. The % humidity stayed constant at 70%.

TABLE 22

CO$_2$ test for Sample 5

| time (h) | humidity (%) | CO$_2$ (vol. %) | O$_2$ (vol. %) |
|---|---|---|---|
| 0 | 11 | 92 | 0.6 |
| 1.75 | 59 | 90.5 | 0.77 |
| 5.5 | 72 | 88.6 | 1.06 |
| 22.25 | 71 | 83.2 | 1.54 |
| 24 | 71 | 83.1 | 1.55 |
| 25.75 | 70 | 83 | 1.5 |
| 27.75 | 70 | 82.6 | 1.55 |
| 29.5 | 70 | 82.5 | 1.57 |
| 46.25 | 70 | 81.2 | 1.87 |
| 48 | 70 | 80.9 | 1.86 |

The maximum peak load for sample 5 was 4800.1 lb. over 0.25 in. This peak load value was greater than that of the peak load value for the comparison sample. This indicates that the addition of calcium peroxide in this amount did increase the strength of the cement sample.

After phenolphthalein was dispersed onto the sample, it did not turn as purple as the rest of the samples. Both the outer edges and the middle of the holes showed no color change, indicating a reaction occurred of converting CO$_2$ to O$_2$. The purple that was visible was very light in color and was also very spotting. This indicates that the quite a bit of the middle of the sample did participate in the reaction of converting CO2 to O$_2$.

Table 23 shows % CO$_2$ and % O$_2$ in a chamber filled with CO2 for up to 49 hours. It also shows the % humidity in the CO$_2$ filled chamber. Over the period of 49 hours, CO$_2$ levels decreased by 13.37% and O$_2$ levels increased by 156%. The % humidity stayed between 35-39%.

TABLE 23

CO$_2$ test for Sample 6

| time (h) | humidity (%) | CO$_2$ (vol. %) | O$_2$ (vol. %) |
|---|---|---|---|
| 0 | 12 | 92 | 0.64 |
| 1.5 | 67 | 90.4 | 0.95 |
| 19.25 | 40 | 83.9 | 1.7 |
| 21 | 37 | 83.9 | 1.63 |
| 24.25 | 37 | 83 | 1.53 |
| 28.25 | 39 | 81.4 | 1.61 |
| 49 | 35 | 79.7 | 1.64 |

The maximum peak load for sample 6 was 4061.4 lb. over 0.25 in. This peak load value was greater than the peak load value of the comparison sample by about 1000 lb. This indicates that the addition of all three additives in this amount increased the strength of the sample.

After phenolphthalein was dispersed onto the sample, there was a color change. However, both the outside edges and the middle of the holes did not show a color change, indicating a reaction occurred of converting CO$_2$ to O$_2$. The purple that was visible was very light in color and was a little spotty. This indicates that some of the middle of the sample did participate in the reaction of converting CO$_2$ to O$_2$.

After evaluating all of the samples, a common pattern was observed with respect to the phenolphthalein test. Both the outside edges and the middle of the holes had no color change, indicating that those spots underwent the reaction of converting CO$_2$ to O$_2$. This suggests that adding holes to the samples increased the area in which the samples underwent the reaction.

TABLE 24

Comparison of Results

| sample | additive(s) | % $CO_2$ decrease | % $O_2$ increase | peak load (lb) | % strength increase |
|---|---|---|---|---|---|
| 1 | None | 11.1 | 59.5 | 3071.2 | N/A |
| 2 | $CaO_2$ | 12.8 | 418 | 4905.1 | 59.7 |
| 3 | $CaO_2$, LPS, lime | 11.7 | 143 | 4075.3 | 32.7 |
| 4 | $CaO_2$, LPS, lime | 9.84 | 126 | 3667.3 | 19.4 |
| 5 | $CaO_2$ | 12.07 | 210 | 4800.1 | 56.3 |
| 6 | $CaO_2$, LPS, lime | 13.37 | 156 | 4061.4 | 32.2 |

In addition, the strength of the samples did increase with the addition of the holes (see Table 24). The samples containing only calcium peroxide had the greatest percent increase in strength. This is not unexpected as calcium peroxide absorbs both $CO_2$ and moisture from the air. As this happens, a reaction takes place that fills the pores in the cement with lime deposits, making the sample denser and therefore stronger.

When comparing the $CO_2$ test among all of the samples, sample 2 increased the $O_2$ levels by the greatest percentage (510%). All of the other samples decreased $CO_2$ levels by roughly the same percent.

Example 9

Investigations with Titanium Oxide

The purpose of these experiments was to determine if a coating of titanium (IV) oxide and polysiloxane on the outside of a concrete specimen, as well as, a coating of lithium polysilicate and lime on the inside of a concrete specimen, would absorb greenhouse gases and convert the trapped gases into non-harmful byproducts (i.e., water).

The materials used in these experiments can be separated into two parts. The first group was the materials for manufacturing of the concrete specimens. The second group was the materials used in the coatings.

Concrete:
Distilled Water
Rocks (non-alkaline)
Coating Materials:
Titanium (IV) Oxide
Polysiloxane Paint
Lithium Polysilicate
Lime A standard concrete mold was used. In order to get the desired 2 in×2 in×2 in specimen geometries, cardboard spacers were cut and placed into the mold. Using the standard mold, there were fifty 2 in.×2 in. specimens. The mold with spacers was then sprayed with Pam cooking spray, which acts as a release for the concrete.

The concrete specimens were made with a 1:1 ratio, by volume, of concrete mix to distilled water. To properly mix the concrete and distilled water, a blender was used until the resulting mixture was well blended. After the concrete was mixed, the alkaline-free rocks were added until the rocks were coated with concrete (typically about 2:1 rocks to concrete mix, by volume). The concrete was placed into the mold in the desired 2 in×2 in×2 in dimensions. The specimens were then left for approximately 24-48 hours, until the specimens were cured. After the specimens were cured, they were placed in a water bath for 28 days. After the water bath, placement on a screen dried the specimens. The screen was used so all four sides of the specimen were dried. After the specimens were dry, approximately 24 hours later, they were then ready for coating.

The inner coating, consisting of lithium polysilicate and lime, was mixed at a 1:1 ratio, by weight. The mixed coating was then put into a needle and syringe. The needle and syringe were used to inject the concrete specimens in three central locations. The coating was injected into each specimen as far into the porous specimen as possible. After the inner coat was applied and dried, the outer coat was applied to the specimens.

The outer coating of titanium oxide and polysiloxane was mixed at a 1:1 ratio by volume. This coating was applied using a paintbrush. All sides were coated, and this process was repeated to ensure a good, even coat.

After the specimens were prepared and coated, they were then ready for testing. The testing was split into two groups (see Table 25). The first group (control) was placed under nitrogen. The second group was placed outside, in a $CO_2$ rich environment (the ledge near the bus parking lot). The second group served as the experimental specimens. Within each group, the specimens were made as controls (no coatings), outer coating, or both inner/outer coatings. The controls were specimens without any coating placed on them. The outer coating specimens only had the titanium oxide/polysiloxane coating. The specimens with both coatings had both the titanium oxide/polysiloxane on the outside, and the lithium polysilicate/lime coating on the inside.

TABLE 25

Sample Set

| Group | Type | Number of Specimens |
|---|---|---|
| Nitrogen | Control | 8 |
|  | Outer Coating | 7 |
|  | Both Coatings | 6 |
| Outside | Control | 9 |
|  | Outer Coating | 9 |
|  | Both Coatings | 9 |

After four months of conditioning outside or under nitrogen, the amount of $SO_x$ and $NO_x$ uptake was ascertained.

Testing Procedure: Sulfate test strips (test strips that approximate $SO_4$ content from 0-500 ppm) and Nitrite/Nitrate test strips (test strips that approximate $NO_2/NO_3$ content from 0-20 ppm and 0-200 ppm, respectively) typically used for testing aquarium water or drinking water were used to evaluate the presence of sulfates, nitrites, and nitrates.

Each concrete specimen was ground using a mortar and pestle. Dry powder (5.117 g) was weighed into a cup, with approximately 8 g of rock reinforcement. Distilled water (40 mL) was then added to the mixture. The mixture was stirred three times over 30 minutes. Following this, the testing was conducted. Results are shown in Table 26.

TABLE 26

Summary of Nitrite/Nitrate/Sulfate Test Results for 4-mo Samples

| Conditioning | Coating | Nitrite (ppm) | Nitrate (ppm) | Sulfate (ppm) |
|---|---|---|---|---|
| Environmental | None | 0.5 | 10 | 300 |
|  | Outer | 0.5 | 10 | 300 |
|  | Outer/Inner | 0.5 | 2 | 300 |

TABLE 26-continued

Summary of Nitrite/Nitrate/Sulfate Test Results for 4-mo Samples

| Conditioning | Coating | Nitrite (ppm) | Nitrate (ppm) | Sulfate (ppm) |
|---|---|---|---|---|
| Nitrogen | None | 0.5 | 5 | 500 |
| | Outer | 0.5 | 5 | 500 |
| | Outer/Inner | 0.25 | 2 | 500 |

After six months of conditioning outside or under nitrogen, the amount of $CO_2$, $SO_x$, and $NO_x$ uptake was ascertained.

Materials: phenolphthalein dye, pH test strips, Sulfate Test Strips, and Nitrate/Nitrite Test Strips.

Phenolphthalein Tests: specimens were cross-sectioned using a hammer and chisel. Phenolphthalein dye was applied to cross-section through a syringe. Data for these phenolphthalein tests are shown in Table 27.

TABLE 27

Phenolphthalein Observations

| Specimen Coating(s) | Conditioning | Phenolphthalein Test Results |
|---|---|---|
| None | $N_2$ | Fuchsia, entire, immediate |
| Outer | $N_2$ | Fuchsia, entire, immediate |
| Outer/Inner | $N_2$ | Fuchsia, entire, immediate |
| None | Outside | Clear, slight pink hue after 24 hours |
| Outer | Outside | Clear, slight pink hue after 24 hours |
| Outer/Inner | Outside | Clear, pink circle in center of cross-section (penny-sized) | pH Tests: Half of each concrete specimen was ground up using a mortar and pestle. Concrete dust was then added to distilled water (40 mL) and allowed to soak for 1 minute. Solution was decanted into a beaker and a pH test strip was submerged for a reading. Data are shown in Table 28.

TABLE 28 pH Test Results

| Specimen Coating(s) | Conditioning | pH Test Estimate |
|---|---|---|
| None | $N_2$ | 11.5 |
| Outer | $N_2$ | 11.5 |
| Outer/Inner | $N_2$ | 11.5 |
| None | Outside | 8.8 |
| Outer | Outside | 9.2 |
| Outer/Inner | Outside | 8.4 |

Sulfate Tests: Each concrete specimen was ground using a mortar and pestle. Dry powder (5.117 g) was weighed into a cup with approximately 8 g of rock reinforcement. Distilled water (40 mL) was then added to the solution. The solution was stirred three times over 30 minutes. Test strip submerged in the solution and the color measured against the Sulfate scale.

Nitrate/Nitrite Tests: Each concrete specimen was ground using a mortar and pestle. Dry powder (5.117 g) was weighed into a cup with approximately 8 g of rock reinforcement. Distilled water (40 mL) was then added to the solution. The solution was stirred three times over 30 minutes. Test strip submerged in the solution and the color measured against the Nitrite/Nitrate scale.

Data for these tests are shown in Table 29.

TABLE 29

Summary of Nitrite/Nitrate/Sulfate Test Results for 6-mo Samples

| Conditioning | Coating | Nitrite (ppm) | Nitrate (ppm) | Sulfate (ppm) |
|---|---|---|---|---|
| Environmental | None | 0.5 | 10 | 300 |
| | Outer | 0.5 | 10 | 300 |
| | Outer/Inner | 0.5 | 2 | 300 |
| Nitrogen | None | 0.5 | 5 | 500 |
| | Outer | 0.5 | 5 | 500 |
| | Outer/Inner | 0.25 | 2 | 500 |

Gases as $CO_2$, $SO_x$, and $NO_x$ are believed to be absorbed from the atmosphere and become an acid which is subsequently neutralized by the concrete's inherent alkalinity. As a result, decreases in a concrete's alkalinity are associated with increases in gases absorbed from the atmosphere.

The concrete with both an outer and inner coating demonstrated the lowest alkalinity, and consequently, an inner/outer coating maximizes pollutant neutralization.

Sulfate testing suggested decreased levels of sulfate present in specimens conditioned outside.

Nitrate testing demonstrated higher nitrate levels in specimens conditioned outside while nitrite testing was too crude to accurately infer differences in nitrite levels between specimens.

The outside coating (titanium in a porous paint) was expected to be able to absorb $CO_2$ and especially $SO_x$ and $NO_x$. The inside coating was designed for $CO_2$ absorption and should neutralize acids formed by the outside coating. Thus, the samples that were exposed outside that had both coatings should have been able to absorb both $SO_x$ and $NO_x$ as well as absorb $CO_2$ with the outside coating and $CO_2$ with the inside coating. These samples had the biggest change from alkalinity so it is logical that they probably absorbed the most gases. The samples in the air controlled air chambers without any gases other than nitrogen were the most alkaline or pink with phenolphthalein and therefore, the least changed and absorbed the least amount of gases.

Figure 9:
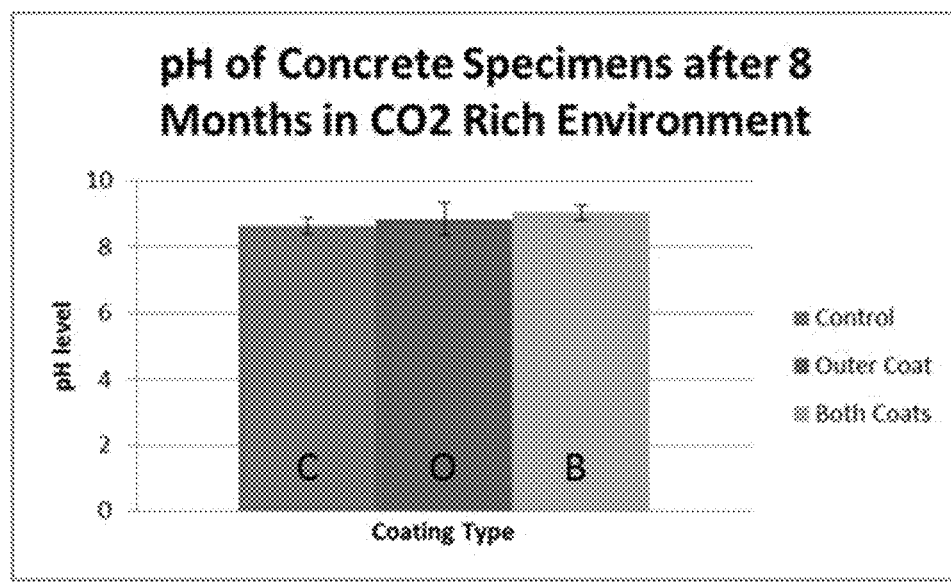
FIG. 9 depicts pH testing results from non-limiting examples of non-coated concrete, concrete with only an outer coating, and concrete with inner and outer coatings.

Data from testing of pH of the samples after 8 months in the $CO_2$-rich environment are shown in FIG. 9.

Example 10

Testing of Concrete Samples at 7, 11, 13, or 21 Days after Fabrication

Figure 10:
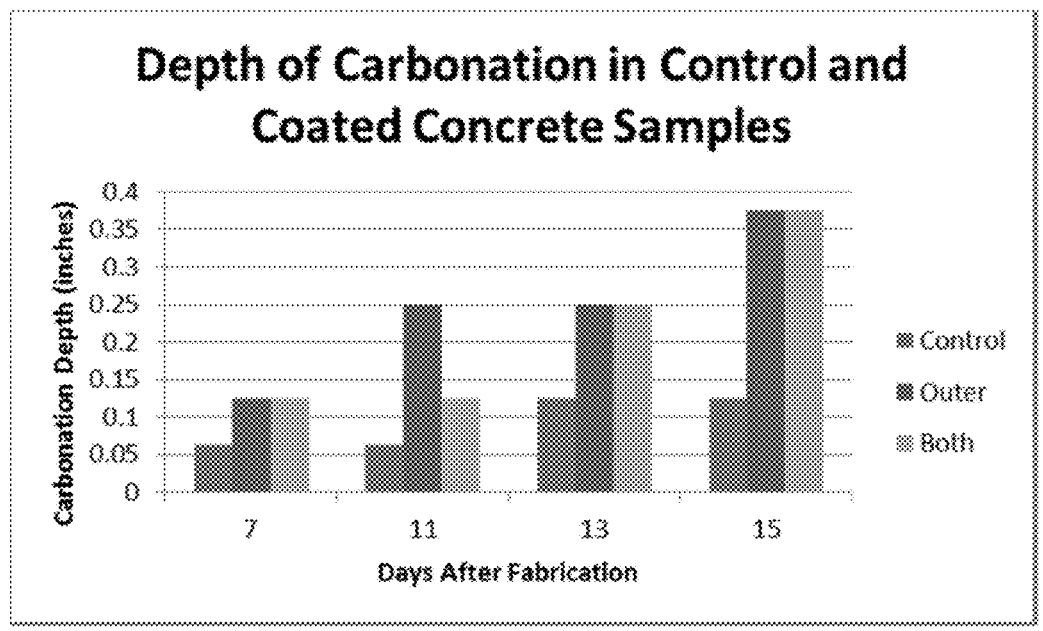
FIG. 10 depicts depth of carbonation assessment results from non-limiting examples of non-coated concrete, concrete with only an outer coating, and concrete with inner and outer coatings.
Figure 11:
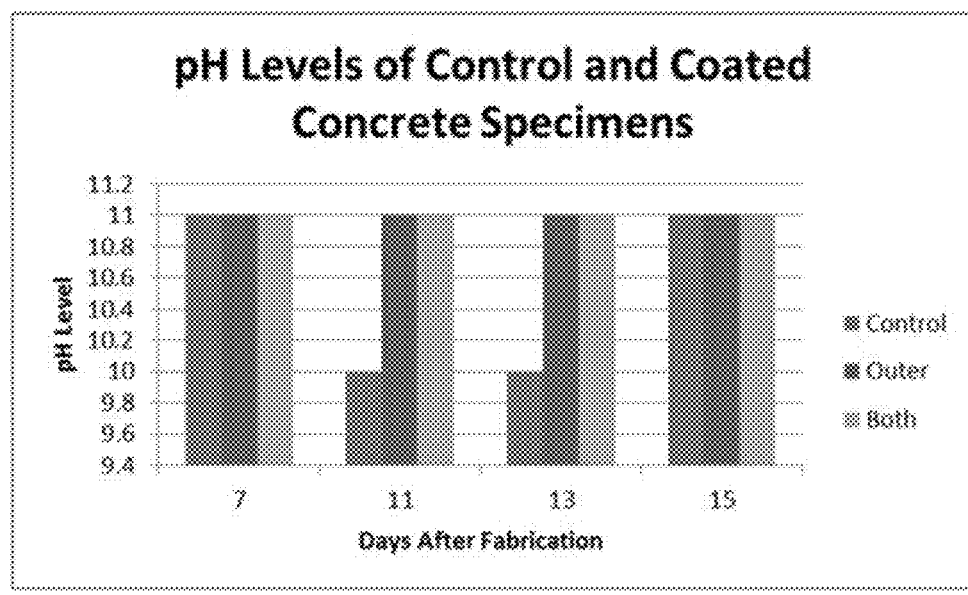
FIG. 11 depicts pH testing results from non-limiting examples of non-coated concrete, concrete with only an outer coating, and concrete with inner and outer coatings.

Phenolphthalein tests were conducted of control samples, samples with only an outer coating, and samples with both an inner and outer coating. Samples were prepared as in Example 9. There appeared to be some indications on the outer perimeter of carbonation in samples with the inner/outer coatings. No indication of carbonation in the control samples. The depth of carbonation was assessed in all samples (FIG. 10). Results of pH testing are shown in FIG. 11.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

Other embodiments are set forth in the following claims.

What is claimed is:

1. A composition consisting of:
   at least 5 wt. % of a silicate based on the total weight of the composition, wherein the silicate is lithium silicate, lithium polysilicate, magnesium polysilicate, or a combination of any two or more thereof, and optionally in further combination with sodium silicate, potassium silicate, or both sodium silicate and potassium silicate;
   at least 20 wt. % of one or more calcium oxygenates; and optionally
   a surfactant, titanium dioxide, and/or sand; and water to 100 wt. %.

2. The composition of claim 1, wherein the silicate consists of lithium polysilicate in combination with sodium silicate, potassium silicate or both sodium silicate and potassium silicate.

3. The composition of claim 1, wherein the silicate is lithium polysilicate.

4. The composition of claim 1 wherein the at least 5 wt. % silicate is 15-30 wt. % silicate.

5. The composition of claim 1, wherein the calcium oxygenates are selected from the group consisting of calcium oxide, calcium hydroxide, lime and calcium peroxide.

6. The composition of claim 1 wherein the at least 20 wt. % calcium oxygenates is 25-75 wt. % calcium oxygenates.

7. The composition of claim 1 wherein the at least 20 wt. % calcium oxygenates is 40-60 wt. % calcium oxygenates.

8. The composition of claim 1 wherein the surfactant is not present.

9. The composition of claim 1 wherein titanium oxide is present.

10. The composition of claim 1 wherein sand is present.

11. The composition of claim 1, wherein the composition absorbs carbon dioxide and gives off oxygen.

12. A concrete structure coated at least in part with the composition of claim 1.

13. A method of preparing the composition of claim 1 comprising combining the silicate, the calcium oxygenates, and the water.

14. A method comprising coating at least in part a concrete surface with a composition of claim 1.

15. The method of claim 14 wherein the surface is a concrete floor, a concrete road, or a concrete bridge.

16. The method of claim 14 wherein the concrete surface comprises Portland cement, geopolymer cement, or fly ash.

17. The composition of claim 1 wherein the surfactant is present and is selected from glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, cocamide MEA, cocamide DEA, dodecyldimethylamine oxide, poloxamers, fatty alcohols, fatty amines, fatty amine salts, quaternary derivatives of fatty amines, or a combination of any two or more thereof.

18. The composition of claim 3 wherein the calcium oxygenate is calcium peroxide, optionally in combination with lime.

19. A composition consisting of:
   5-40 wt. % of a silicate based on the total weight of the composition, wherein the silicate is lithium silicate, lithium polysilicate, magnesium polysilicate, or a combination of any two or more thereof, and optionally in further combination with sodium silicate, potassium silicate, or both sodium silicate and potassium silicate;
   20-75 wt. % of one or more calcium oxygenates;
   optionally 1-20 wt. % titanium dioxide;
   optionally 1-70 wt. % sand;
   optionally a surfactant selected from glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, cocamide MEA, cocamide DEA, dodecyldimethylamine oxide, poloxamers, fatty alcohols, fatty amines, fatty amine salts, quaternary derivatives of fatty amines, or a combination of any two or more thereof; and
   water to 100 wt. %.

* * * * *